United States Patent
Johnstone et al.

(10) Patent No.: US 12,540,963 B1
(45) Date of Patent: Feb. 3, 2026

(54) SYSTEMS, METHODS, AND COMPUTER READABLE MEDIA FOR A HEURISTIC APPROACH TO FACILITATING ANALYSIS OF RADIO FREQUENCY RECORDINGS

(71) Applicant: Keysight Technologies, Inc., Santa Rosa, CA (US)

(72) Inventors: Colin Johnstone, Fife (GB); Andrea Ferrero, Lostallo (CH); Masaharu Goto, Saitama (JP); Martin Ware Curran-Gray, Fife (GB); Andrew John Fisher, Edinburgh (GB); Duncan Smith, South Queensferry (GB)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 133 days.

(21) Appl. No.: 18/620,318

(22) Filed: Mar. 28, 2024

(51) Int. Cl.
*G01R 29/08* (2006.01)

(52) U.S. Cl.
CPC ..... *G01R 29/0892* (2013.01); *G01R 29/0814* (2013.01)

(58) Field of Classification Search
CPC .......... G01R 29/0814; G01R 29/0892; H04B 17/16; H04B 17/19; H04B 17/0085; H01Q 3/267
See application file for complete search history.

(56) References Cited

U.S. PATENT DOCUMENTS

| | | | |
|---|---|---|---|
| 8,818,749 B2 * | 8/2014 | Friedrich | G01R 35/005 |
| | | | 702/183 |
| 10,060,961 B1 | 8/2018 | Fleizach et al. | |
| 10,241,202 B2 | 3/2019 | Becker | |
| 11,343,002 B2 * | 5/2022 | Leather | H04B 17/29 |
| 11,641,243 B2 * | 5/2023 | Song | H04B 17/0085 |
| | | | 455/226.1 |
| 2008/0016422 A1 * | 1/2008 | Ochi | G01R 31/31725 |
| | | | 714/E11.155 |
| 2015/0002172 A1 * | 1/2015 | Buxton | G01S 13/04 |
| | | | 324/642 |
| 2019/0199382 A1 | 6/2019 | Varughese et al. | |
| 2020/0244294 A1 * | 7/2020 | Itkin | H04B 1/1027 |
| 2020/0386799 A1 * | 12/2020 | Nähring | G01R 29/0892 |
| 2021/0376852 A1 | 12/2021 | Guezelarslan et al. | |
| 2022/0294542 A1 * | 9/2022 | Song | G01R 27/04 |

OTHER PUBLICATIONS

"N6890A Spectrum View Software", Keysight Technologies (2024).
"Keysight Spectrum Management Software", Keysight Technologies (2024).

* cited by examiner

*Primary Examiner* — Tung X Le (57) ABSTRACT

Methods, systems, and computer readable media for a heuristic approach to facilitating analysis of radio frequency recordings. An example method includes receiving a time series of radio frequency (RF) spectra of a test RF signal; identifying first detected signals within the time series of RF spectra; relating the first plurality of detected signals to second detected signals within the time series of RF spectra; characterizing the first detected signals and the second detected signals with a set of characteristic parameters; and outputting a reduced size time series of RF spectra using the set of characteristic parameters.

20 Claims, 11 Drawing Sheets

SYSTEMS, METHODS, AND COMPUTER READABLE MEDIA FOR A HEURISTIC APPROACH TO FACILITATING ANALYSIS OF RADIO FREQUENCY RECORDINGS

TECHNICAL FIELD

The subject matter described herein relates to methods, systems, and computer readable media for a heuristic approach to facilitating analysis of radio frequency recordings.

BACKGROUND

In the evaluation of radio frequency (RF) device and system performance, analysis of RF recordings can play an important role. These recordings, captured by specialized equipment, represent the raw signal data transmitted across the air interface. Through spectrum analysis techniques, engineers can deconstruct the recordings to assess various parameters. This includes quantifying signal strength, identifying occupied frequency bands, and measuring metrics like carrier leakage and occupied bandwidth. By analyzing variations in the signal over time, the analysis can also detect issues like interference, signal distortion, and transient errors. The analysis, however, can consume large amounts of computing resources and potentially take large amounts of time.

Accordingly, a need exists for methods, systems, and computer readable media for facilitating analysis of radio frequency recordings.

SUMMARY

Methods, systems, and computer readable media for a heuristic approach to facilitating analysis of radio frequency recordings. An example method includes receiving a time series of radio frequency (RF) spectra of a test RF signal; identifying a first plurality of detected signals within the time series of RF spectra; relating the first plurality of detected signals to a second plurality of detected signals within the time series of RF spectra; characterizing the first plurality of detected signals and the second plurality of detected signals with a set of characteristic parameters; and outputting a reduced size time series of RF spectra using the set of characteristic parameters.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

This document describes a system for a heuristic approach to facilitating analysis of radio frequency recordings. In particular, this document describes systems and methods for converting a set of incoming radio frequency (RF) spectra into a set of descriptive records for passing to a test visualization system for use in generating test display screens for a test engineer. The systems and methods can be used for facilitating real-time, ultra-fast analysis of massive RF recordings, for example, where computationally intensive approaches would be inappropriate due to the time and computing resources demanded by such approaches.

Figure 1:
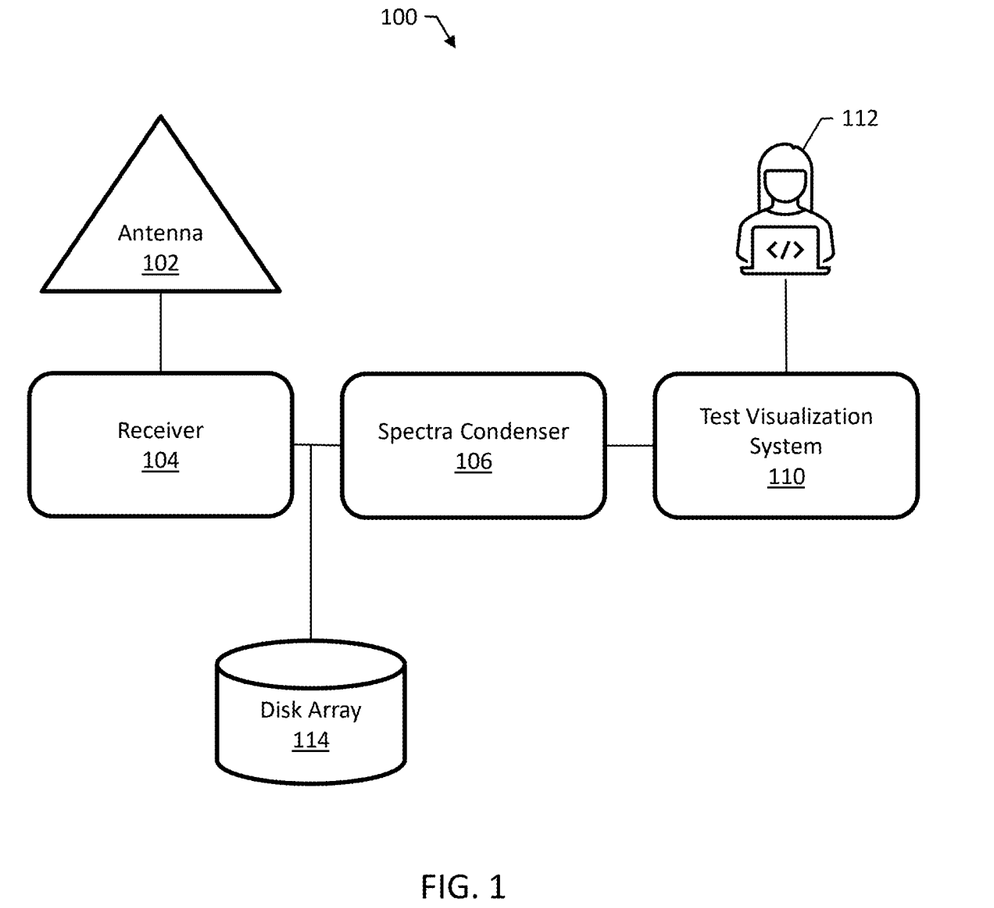
FIG. 1 is a block diagram of an example system for facilitating analysis of RF recordings.

FIG. 1 is a block diagram of an example system 100 for facilitating analysis of RF recordings. The system 100 includes an antenna 102 and a receiver 104; although the antenna 102 and receiver 104 are shown in FIG. 1, the RF recordings can be obtained from any appropriate source. The antenna 102 and receiver 104 can be, e.g., configured to receive incoming RF signals from multiple cellular communications systems or systems under test.

The system 100 includes a spectra condenser 106, a test visualization system 110 for displaying selected information to a test engineer 112, and a disk array 114. In operation, the spectra condenser 106 converts a set of incoming RF spectra into a set of descriptive records for passing to the test visualization system 110. The test engineer 112 can be any appropriate person for viewing the results of the test visualization system 110. For example, the test engineer 112 can be an RF engineer, an R&D engineer, or a manager.

The test visualization system 110 allows the test engineer 112 to examine a large amount (for example, an hour) of RF spectra diagrams. For example, the test visualization system 110 can use cluster technique to color-code and highlight various aspects of the RF spectra in a manner that permits quick and detailed analysis of a massive amount of incoming data in a productive manner. In operation, the receiver 104 feeds the disk array 114 and the spectra condenser in parallel.

To enable the real-time, ultra-fast analysis of the RF records, the spectra condenser 106 is configured to reduce to the RF spectra in a concise manner, retaining important information relating to the signals within the RF spectra, without overloading the test visualization system 110 with more information than it can handle at a target speed. Moreover, the spectra condenser 106 is configured to perform the reduction at very high speeds by virtue of avoiding computationally intense approaches, for example, some kinds of machine learning based compression methods.

Instead, the spectra condenser 106 uses a heuristic approach that involves relating detected signals to other signals and characterizing signals with a set of characteristic parameters.

The spectra condenser 106 need not retain enough information to allow detailed demodulation of incoming signals. Instead, the spectra condenser 106 is configured to detect that signals are present that may be the subject of further testing. For example, further testing could include accessing the original, unreduced recording data for demodulation at a time corresponding to a signal identified in the reduced size data.

The original recording data can be captured into the disk array 114. In some cases, the original in-phase and quadrature (IQ) data can include an hour or more of data, requiring a large amount storage such as the disk array 114. It may be many terabytes long. The system 100 enables the test engineer 112 to quickly find items of interest within these terabytes and be directed to the correct (corresponding time) location within the IQ store where the relevant IQ data is stored and can then be retrieved and demodulated or examined in other ways.

In general, the spectra condenser 106 operates by finding signals within RF spectra and relating those signals to other signals, both in frequency and time, that allows those signals to be described in a simple manner. For example, a single tone could be described as having a position (peak frequency), bandwidth, amplitude, and duration. The length is the time for which the signal exists; it may last for many consecutive RF spectra. Another example is a modulated signal; this signal can also be characterized by a position, overall bandwidth, and amplitude. The content of the modulation may not be needed for the purposes of visualizing a large amount of data, for example, an hour of RF recordings.

Figure 2:
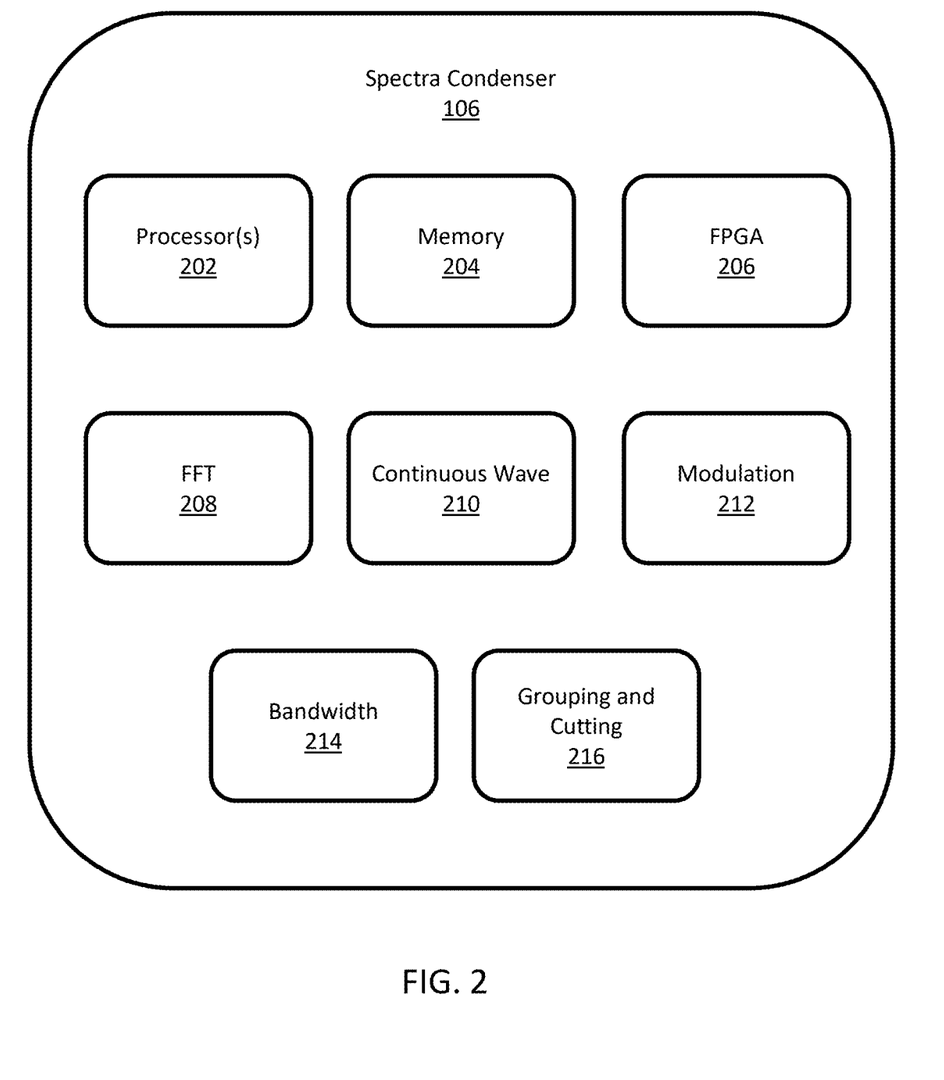
FIG. 2 is a block diagram of an example implementation of the spectra condenser.

FIG. 2 is a block diagram of an example implementation of the spectra condenser 106. The spectra condenser 106 can be implemented using one or more processors 202 and memory 204, or a field programmable gate array (FPGA) 206, or both.

The spectra condenser 106 uses a heuristic approach that avoids time consuming, computationally intensive algorithms; for example, the spectra condenser 106 can avoid using machine learning models. The spectra condenser 106 can include a Fourier transform engine 208, e.g., a fast Fourier transform engine for converting the incoming IQ data to RF spectra. Alternatively, the Fourier transform may be performed by a component outside the spectra condenser 106 so that a time series of RF spectra is input to the spectra condenser 106.

In operation, the spectra condenser 106 is configured for receiving a time series of RF spectra of a test RF signal and identifying first detected signals within the time series of RF spectra. The spectra condenser 106 is configured for relating the first detected signals to second detected signals within the time series of RF spectra and characterizing, in real-time, the first detected signals and the second detected signals with a set of characteristic parameters.

The spectra condenser 106 facilitates analysis of the test RF signal by outputting a reduced size time series of RF spectra using the set of characteristic parameters. Outputting the reduced size time series of RF spectra includes outputting the reduced size time series of RF spectra to a test visualization system configured to present, to a test engineer, at least a portion of the reduced size time series of RF spectra to highlight one or more aspects of the first plurality of detected signals and the second plurality of detected signals.

The spectra condenser 106 can use one or more of a variety of techniques to characterize detected signals with characteristic parameters to output a reduced size time series of RF spectra. These techniques are described in detail below with reference to FIGS. 4A-4B, 5A-5C, 6A-6C, 7A-7D, and 8A-8B. For example, characterizing detected signals can include characterizing those signals with a frequency position, bandwidth, amplitude, start time, and end time. The spectra condenser 106 can include one or more of the following modules, implemented in software or on the FPGA 206: a continuous frequency wave module 210, a modulation/grouping module 212, a bandwidth calculation module 214, and a grouping and cutting module 216.

Figure 3:
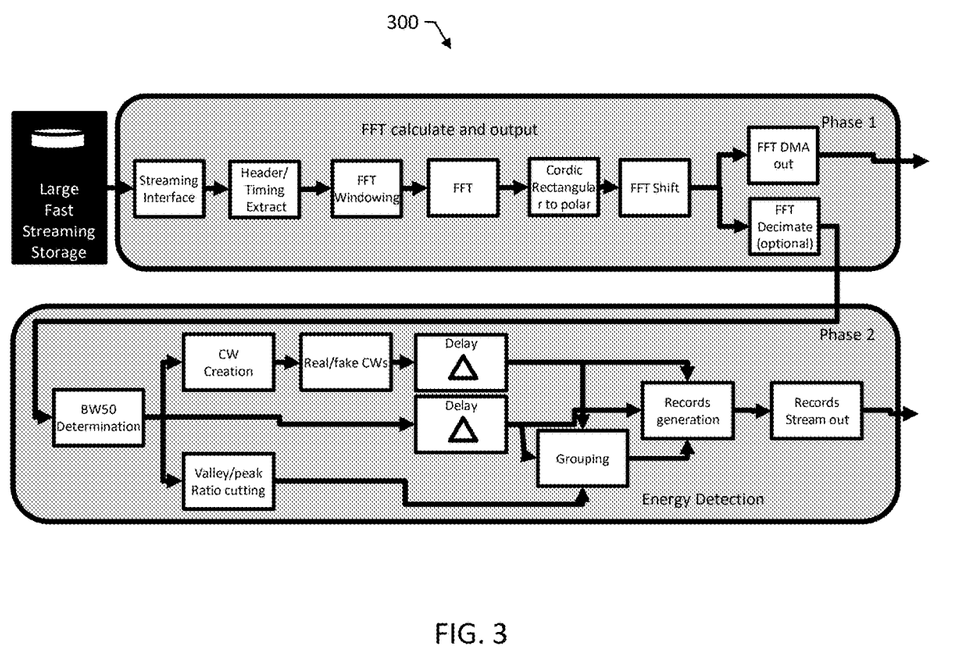
FIG. 3 is a block diagram of example functional blocks that can be implemented within an example FPGA of the spectra condenser.

FIG. 3 is a block diagram of example functional blocks that can be implemented within an example FPGA 300 of the spectra condenser 106. Various implementations of the FPGA 300 are possible, and the block diagram of FIG. 3 is shown for purposes of illustration and not limitation.

The FPGA 300 is divided into two phases. Phase 1 is configured calculating FFTs and writing (e.g., using direct memory access) summarized sets of FFTs to computer memory, e.g., over a suitable bus such as peripheral component interconnect (PCI). Phase2 is configured for summarizing the signals contained within the FFT spectra combining individual signals across frequency and time to produce a usable summary that can be fed, at speed to a test visualization system. The test visualization system, in some examples, includes a machine-learning-based software program that can take, e.g., one hour's worth of summarized data and very quickly produce a set of spectrograms that can be color-coded according to a programmable set of criteria and test engineer requirements to allow the test engineer to very quickly home in on signals of interest.

The FPGA 300 can be configured to operate at the line rate. For example, in some implementations, the FPGA 300 will create an 8192-long FFT for every 4096 input samples without any gaps. The result is around half a million FFTs/second.

Data, e.g., 16-bit I and 16-bit Q values, arrives over the input interface at a variable rate up to, e.g., 2.4G IQ pairs (samples) per second. It passes through the ODI interface logic where it is de-packetized into a continuous stream of IQ values. Each packet has a header which, among other things, contains an accurate timestamp. The header extractor extracts these timestamps and associates them with the incoming data. The FFT windowing block splits the incoming data into sets of 8192 values, performs a windowing function on the value set and attaches a timestamp to each set. Each set is then passed into the FFT block. The FFT windowing block repeats this process every 4096 input samples, meaning that there is a 50% overlap of samples on every FFT.

The FFT block does a time to frequency conversion on the sets of 8192 IQ values producing a complex FFT of length 8192 per input set. This is fed into a cordic rectangular to polar converter that takes every complex frequency bucket value and replaces it with a magnitude and angle. The angles are discarded. Only the magnitudes are passed on. The resulting set of 8192 frequency amplitudes may be FFT shifted before being passed through a peak and sum block that works out the average and peak values for a set of FFTs before passing them over a DMA interface via PCI to the PC's memory. The purpose of this interface is to allow the user to check that it is correctly connected at the start of a recording.

The energy detection block takes in the FFT amplitudes and extracts from this a set of signals of interest. At the highest level, a signal is a pulse of frequency that may be isolated and invariant over consecutive FFTs. A set of signals might be from a modulated signal or a frequency varying signal such as a chirp. The circuit attempts to reduce the large number of signals that would normally appear in a spectrogram to a set of records, each one describing something that would normally show up as a colored line on a spectrogram that uses color to indicate the amplitude of a spectral component.

For example, the FPGA 300 can perform this operation by detecting the position, bandwidth and amplitude of individual signals, combining them when they form modulated signals, into one signal and/or combining fixed frequency signals into position. amplitude, bandwidth and duration.

The incoming FFT amplitudes fed into Phase 2, firstly have their locations, peak locations and bandwidth determined. This information is then passed into the CW creator that looks for frequency invariant signals. They are also passed into the valley/peak ratio cutting block to determine positions in a spectrum where two close-together modulations are separated.

A separate block takes the CW information and determines if the signals could overlap a group or not. All the information obtained so far is passed into delay memories so that all the data arrives at the grouping block on the exact clock cycles it is needed. The grouping block finds modulated signals and combines them into a single outgoing signal that summarizes the contents of the modulated set. All the information obtained so far, is then fed into the records generating block, where it is converted into a set of signal-describing records that are then streamed to computer memory over a PCI link.

At 2.4 GSamples per second, one FFT is produced every 1.7 us. The energy detection block works in blocks of 1024 FFTs. A CW that traverses a block boundary will be chopped into lengths of 1024 (or less if it starts or finishes within the block). The FPGA performs the FFTs at speed and passes the resulting spectra to the energy detection circuitry. All the above CW detection, grouping, cutting and bandwidth calculation is carried out at speed, and the resulting signals are sent as sets of single records, each record describing a single signal.

Pathological signal spectra exist that would overload the test visualization system. For this reason, the application of thresholds to the spectra can be made programmable, such that the threshold can be raised to reduce the number of signals being processed and passed to the test visualization system.

The programmable threshold can be configured to allow different thresholds at different points in the spectrum. A user can set a high threshold on frequencies that are of no interest allowing signals at more interesting frequencies to get through. In some examples, the test visualization system can detect when it is about to be overloaded and the software can dynamically adjust the thresholds, as signal mixes change, to keep a relatively stable stream of signals passing to the software.

Figure 4A:
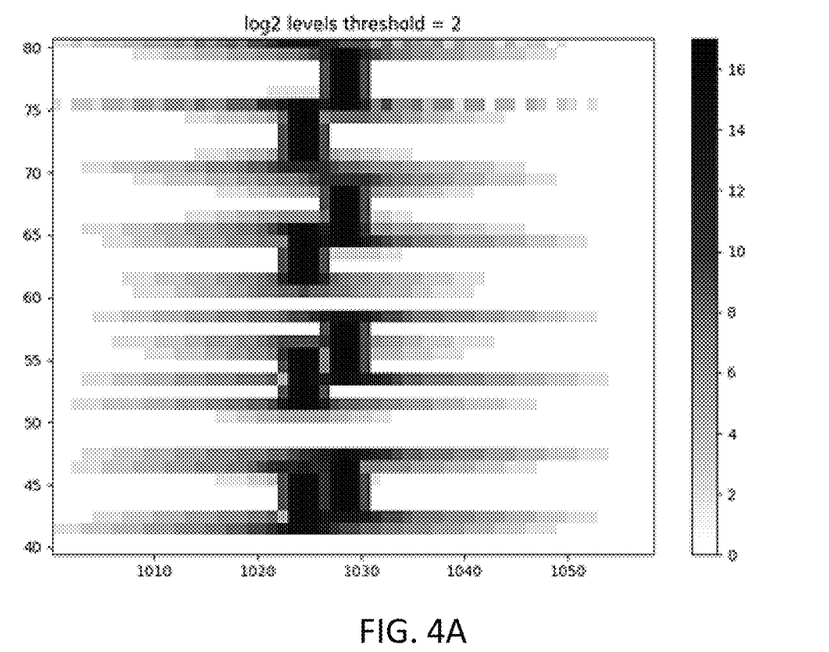
FIGS. 4A-4B illustrate continuous wave (CW) detection and characterization using example data.
Figure 4B:
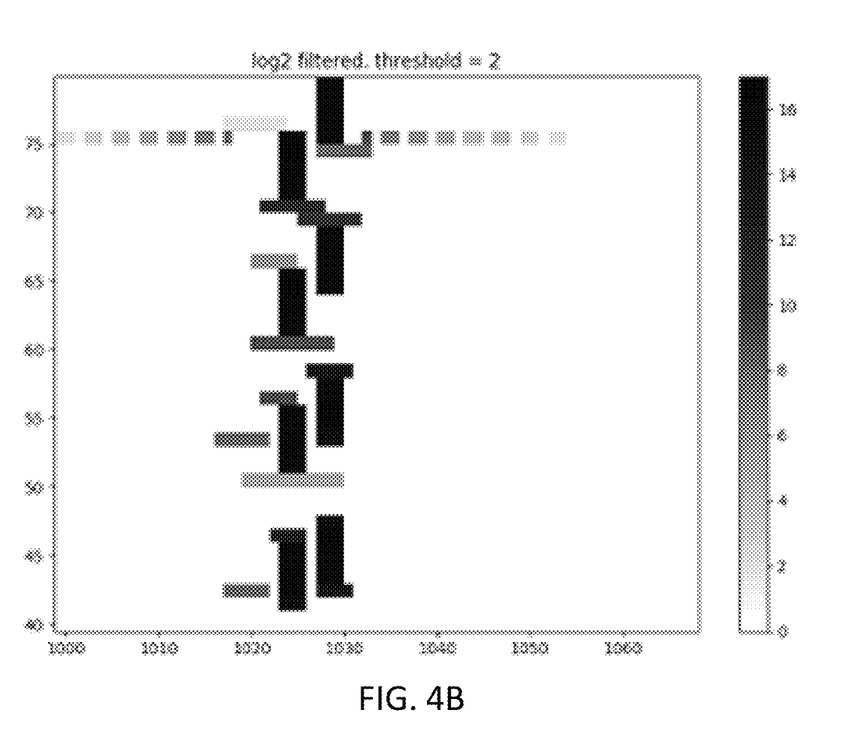

FIGS. 4A-4B illustrate continuous wave (CW) detection and characterization using example data.

FIG. 4A shows a spectrogram of an FFT. The horizontal direction represents frequency, the vertical consecutive FFTs (~2 us apart in this case). The amplitude of every FFT frequency bucket is represented by shading. It shows two narrow black signals that are turning on and off at different regular intervals. Sending all the amplitude information would potentially be wasteful of time and computing resources. The information that will be useful to the test visualization system is that there is a signal that starts at time X and finishes at time Y with a certain position and bandwidth.

After processing through the detection and characterization processes, the spectrogram shown in FIG. 4B is obtained. Most of the "mush" has disappeared. The two black signals now have the same bandwidth throughout each signal. They look like vertical rectangles.

There is some extra information at the start and end of some of the black signals, but this is an artifact of performing FFTs on signals that start or stop suddenly. Even so, the algorithm has greatly reduced the artifacts as well. The black signals can be converted into two dimensional rectangles, with the horizontal dimension being bandwidth and the vertical direction, time. The rectangle has an amplitude (average amplitude is used) and a center/peak frequency that is the same for every FFT. Signal peak frequencies tend to be very stable. A signal that can be reduced to a rectangle like this is termed a continuous wave (CW). Slight (+/−1 bucket) variations in bandwidth are ignored. Should the bandwidth increase, decrease or move by more than 1 bucket then a new CW will start.

Figure 5A:
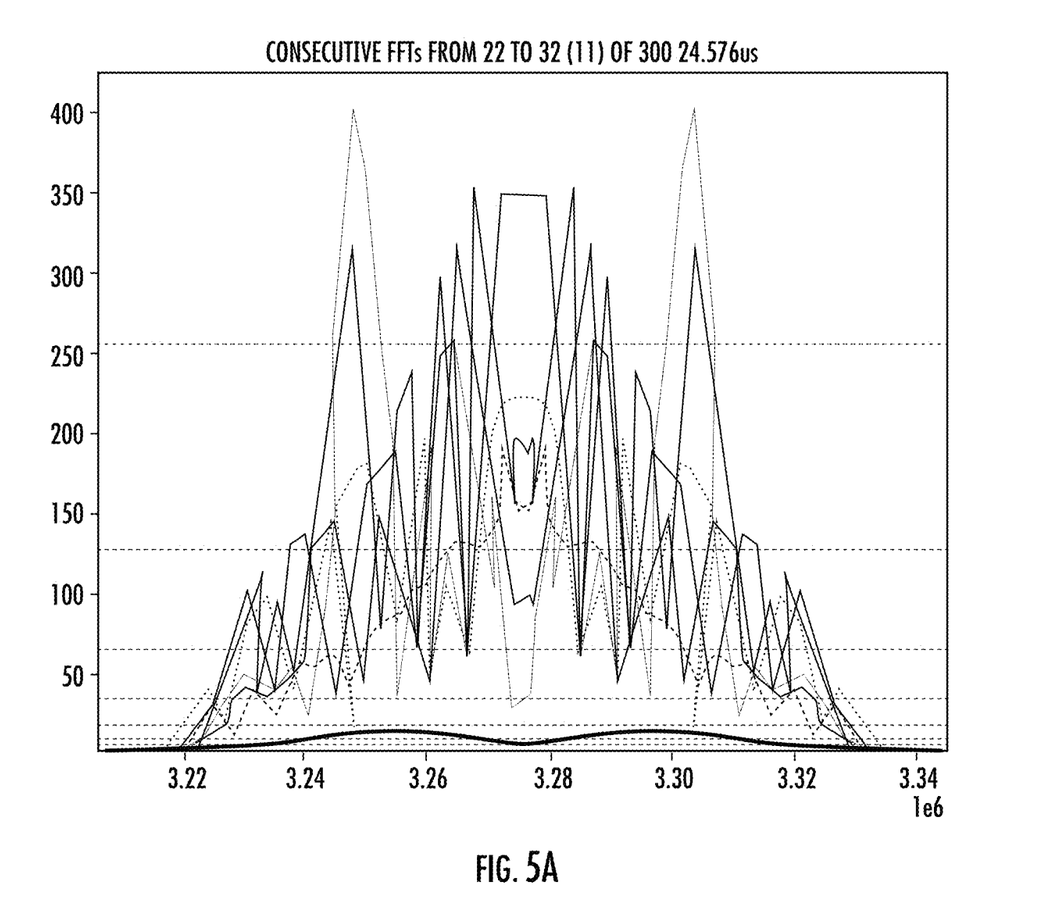
FIGS. 5A-5C illustrate signal characterization using modulation and grouping by showing example signals.
Figure 5B:
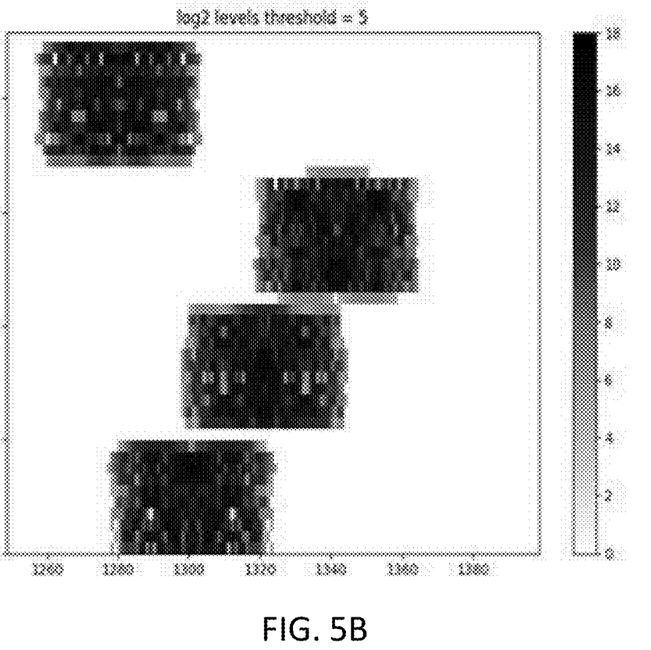
Figure 5C:
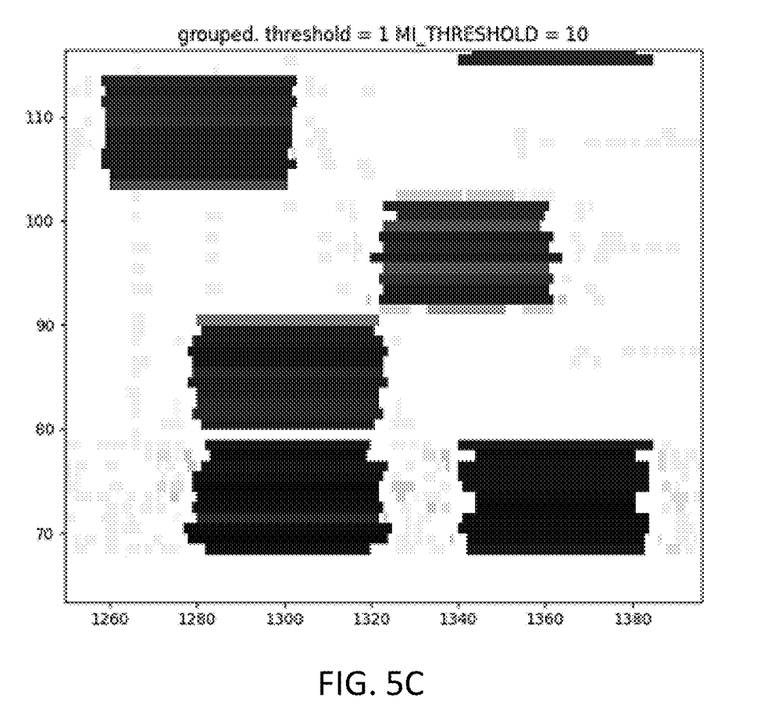

FIGS. 5A-5C illustrate signal characterization using modulation and grouping by showing example signals.

FIG. 5A is a waveform diagram of a set of consecutive FFTs each a different shading, showing a linear plot of the amplitude of every frequency bucket over a smallish frequency range. It can be readily seen that there are a lot of peaks and valleys in every waveform. A signal is defined as that part of a waveform between two valleys. There are a lot of signals within each waveform. This is a typical waveform of a modulated signal. The set of signals tend to start and end at similar frequencies. If every signal were to be converted into a signal-describing record, then there would be a lot of signals on every FFT, which would potentially interfere in the system's ability to meet time and computing resource constraints.

FIG. 5B shows a spectrogram of the example signal. It can be seen that the overall "shape" of a time-bound modulated signal roughly forms a rectangle. This particular spectrogram is of a frequency-hopping signal where the shape of the individual hops is similar. The stripiness of each row shows how many signals there are in each row.

After applying the signal characterization algorithms to a modulated signal, the output looks like the spectrogram shown in FIG. 5C (not exactly the same signal as FIG. 5B). Each modulated signal has been reduced to one grouped signal per modulation per FFT, which results in a considerable saving for wide modulations. The amplitude of a modulation is defined as the peak amplitude of the largest constituent signal. The two modulations that occur at the same time are far enough apart in frequency to be easily distinguished. This is not always the case. The system can be configured to distinguish two modulations that are adjacent.

By setting a signal threshold, all the low-level amplitude signals can be discarded and records will only be generated for the larger modulation signals.

The system can use any appropriate algorithm for joining together a set of signals as a group or modulation. In some examples, a threshold is applied to the FFT such that only signals where the peak exceeds the threshold are considered signals. Signals that are too low are set to all-valleys. A modulation starts after a double-valley (i.e., two consecutive valleys) and ends at the next double valley.

As mentioned above, two modulated signals could occur right next to each other. The system can be configured to detect this and produce "cutting points." If a single group traverses a cutting point then it is cut into two separate groups with a modulated signal generated for each. A modulation starts at the bandwidth start point of its first constituent signal and ends at the bandwidth endpoint of its last constituent signal.

Figure 6A:
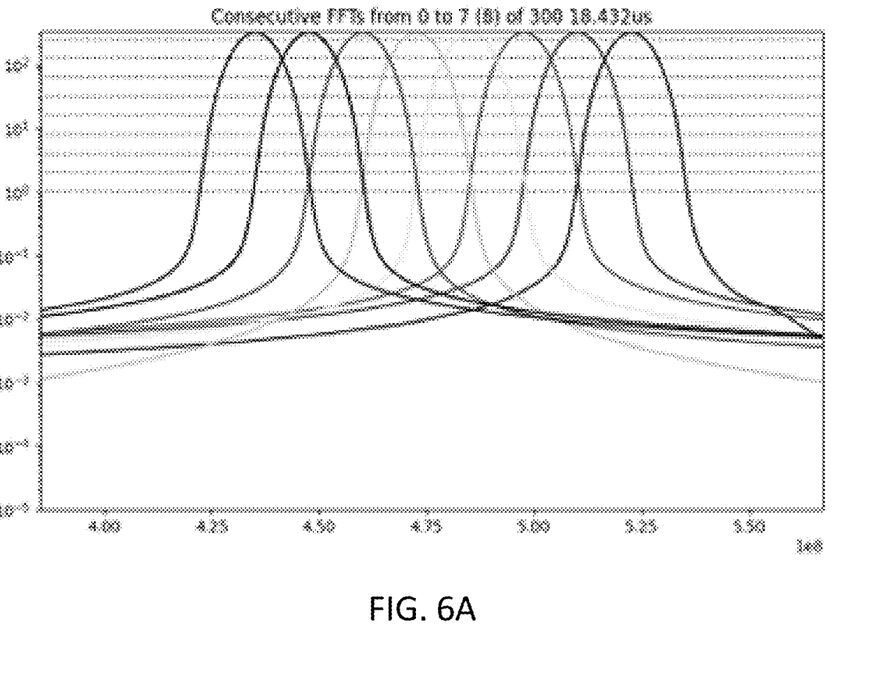
FIGS. 6A-6C illustrate adjustments for bandwidth anomalies.
Figure 6B:
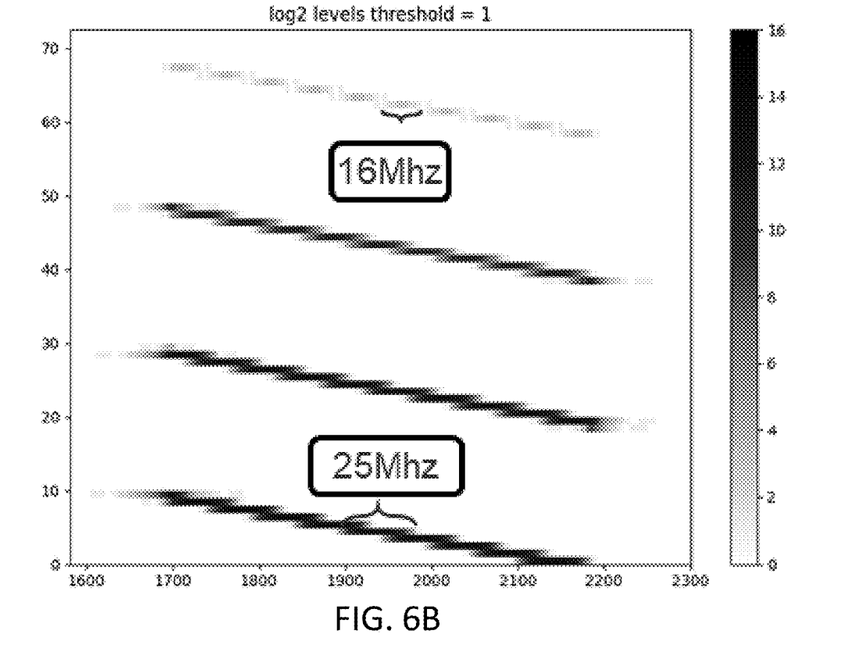
Figure 6C:
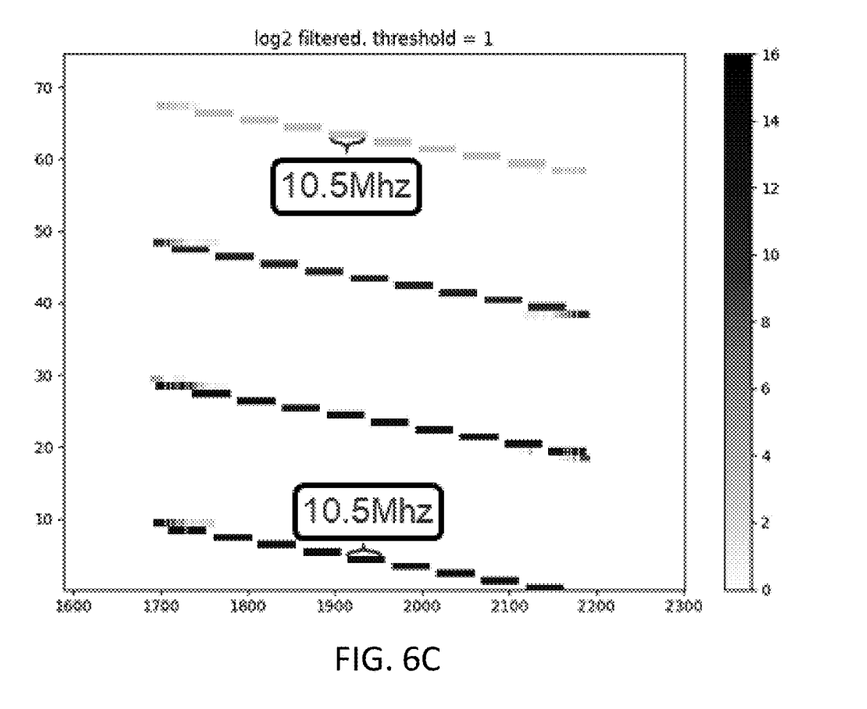

FIGS. 6A-6C illustrate adjustments for bandwidth.

In some applications, RF signals are subject to noise, interference and fading. When faded, a signal's amplitude can be greatly reduced. In some cases, determining the bandwidth of faded signals can be problematic.

Consider a chirp signal. This is a common radar signal where the frequency changes continuously. When passed through an FFT, each FFT will show a similar waveform shape shifted by the change in frequency that occurs over one FFT time, as shown in FIG. 6A. FIG. 6A shows the spectrum of a number of consecutive FFTs in different shades. The non-flat-topped nature of this waveform is down to a process known as windowing. This overcomes some of the limitations of the FFT algorithm when it comes to pulse frequency discrimination but, at the same time, rounds the top of chirps. The shape of each pulse looks the same and they all have the same bandwidth.

FIG. 6B shows the spectrogram of this chirp in the presence of fading. Some of the chirps will be higher than others. One set is considerably faded relative to the other chirps. If the bandwidth is measured from the start of each signal to its end then the high signals are found to have a bandwidth of 25 MHz while the faded signal has a visible bandwidth of 16 Mhz. This is counter intuitive. The signal started off as the same signal, but was subject to differing amounts of fading on the way to the detector. Nothing has been done to change the amount of frequency occupied by the signal (a common definition of bandwidth) so it should have the same measured bandwidth at the receiver.

The system can be configured to overcome this bandwidth anomaly. Instead of measuring from the start to end of the signal, the bandwidth was defined as the region of a signal that is greater or equal to 50% of the signals peak value (or another appropriate percentage). As a signal is faded, its peak amplitude reduces but so does the amplitude of the rest of the signal.

The actual bandwidth remains the same as can be shown in FIG. 6C, which is a copy of the same spectrogram with this new definition applied. This time, in all cases, the bandwidth of the individual signals is measured as 10.5 MHz. Defining a bandwidth as a certain percentage of "the signal" is somewhat intuitive and using 50% makes all the arithmetic straightforward. The part of a signal that constitutes the bandwidth is that which is >=50% of the peak value. This bandwidth can be labelled "BW50" showing that it is based upon 50% of the peak amplitude.

Figure 7A:
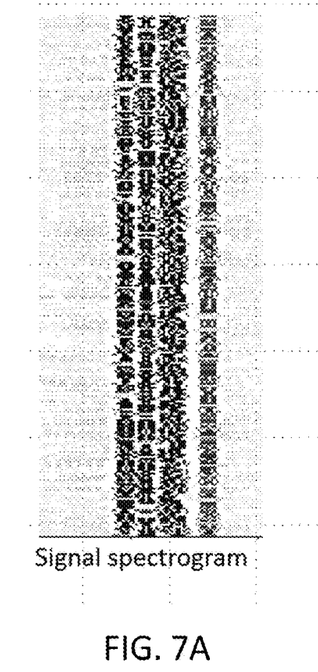
FIGS. 7A-7D illustrate grouping, cutting, and processing of overlapping CWs.
Figure 7B:
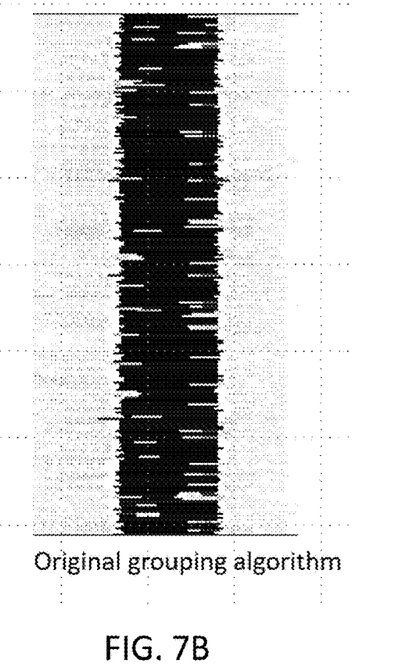
Figure 7C:
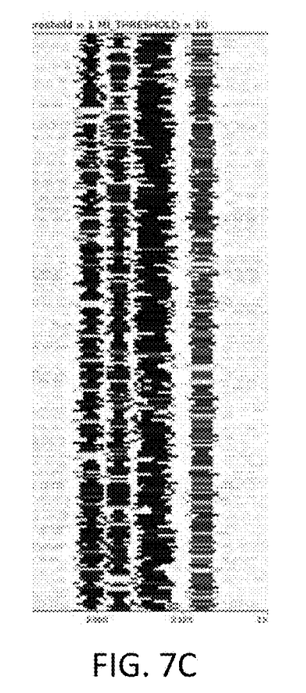

FIGS. 7A-7C illustrate grouping, cutting, and processing of overlapping CWs.

Modulated signals are grouped together by virtue of their signals being adjacent. In some cases a small modulated signal may occupy some of the frequency space of a large CW signal.

The existence of this sort of interference may be important to a test engineer. Therefore, the system can be configured to define and detect an overlapping CW and handle the resulting amplitudes accordingly. Also the grouping algorithm can jump across close-together-in-frequency modulations. For this reason the system can be configured to spot the join between two modulated signals and split them into two separate groups.

The FFT signal is a set of consecutive frequency bucket amplitudes. This can be broken down into rising slopes and falling slopes. At the amplitude inflection points there are peaks and valleys. A modulated signal that occurs over time is characterized by a rather random set of signals. The constituent signals also tend to have small bandwidths, generally of the order of 1-4 buckets. The peaks and valleys of each consecutive FFT rarely line up.

FIG. 7A is a signal spectrogram of a bluetooth-spaced modulation. Modulations occur on 1 MHz spaced steps and in this case, there are three modulated signals 2 or 3 Mhz apart and two modulated signals one MHz apart. The human brain can just about make out most of the individual modulations. However, when the grouping algorithm is applied to this signal, it results in the spectrogram shown in FIG. 7B. All the individual modulations have been mostly merged into one. This is likely unacceptable. The individual modulations present have all-but disappeared.

Figure 7D:
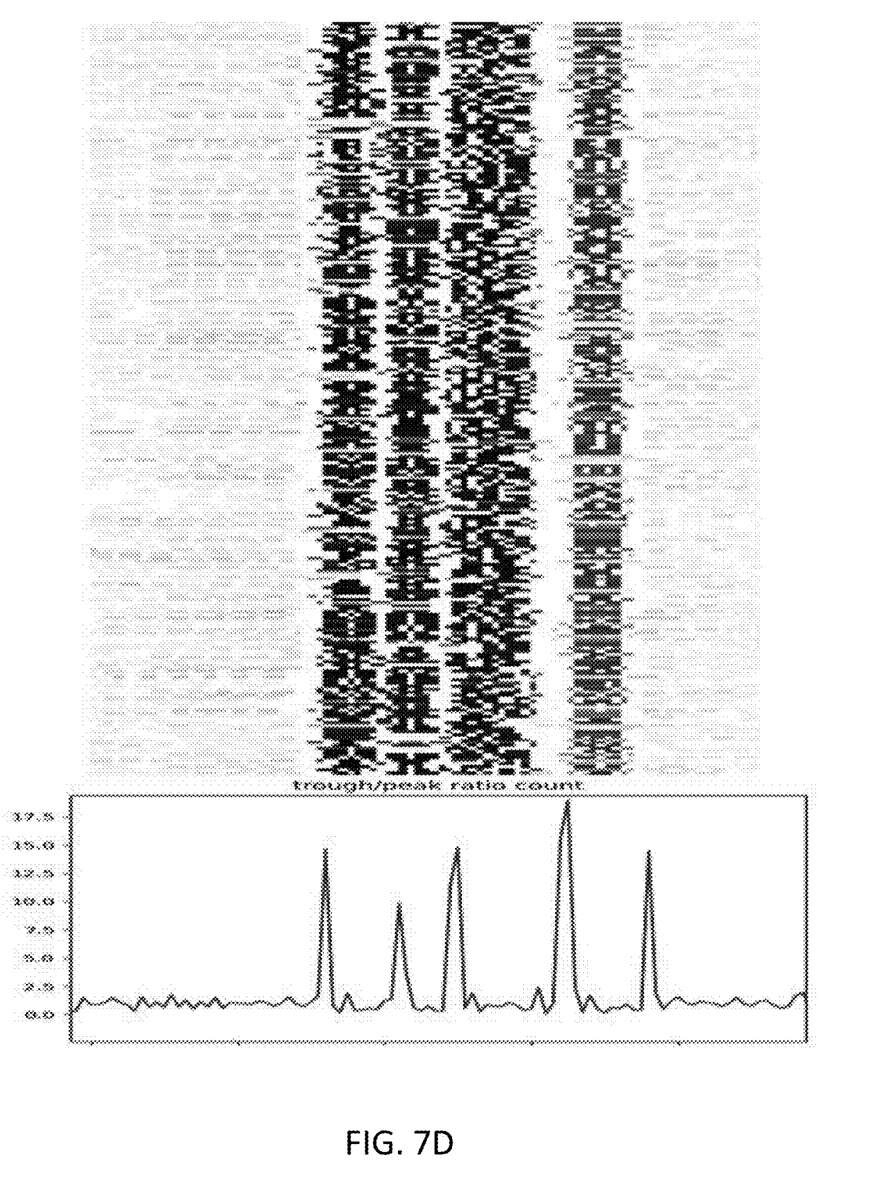

In view of this, the system can be configured to keep the individual modulations apart as much as possible without causing other problems. FIG. 7C shows the result of applying the cutting algorithm to FIGS. 7A and 7B. Each 1 MHz modulation is reduced to a single signal where possible. The process includes summing the incidence of valleys and peaks that occur at each bucket and then determining the ratio of valleys to peaks. A graph of this ratio is shown in FIG. 7D below the raw signal spectrogram. There are sharpish peaks at each expected modulation gap.

The process includes determining the valley/peak ratio and if it exceeds a programmable value (for example, three) then a "cut" bit is set at that bucket and any group that traverses the "cut" bit will be broken in two. This forms the basis for the cutting algorithm but there is a complication. It takes a reasonable number of consecutive FFTs to get enough "samples" of peaks and valleys to work out the ratio.

In addition, consider a hopping modulation. At the start of the modulation the pattern of signals is completely different to that which went before. There could be a modulated signal in progress when suddenly a new modulation commences right next to it. Or two close-together modulations could start at the same time. The two need to be separated, but up to that point in time, there have been no peaks or valleys at all (except in the noise) in the preceding FFTs.

The solution to this is to use the peaks and valleys of samples both before and after the current FFT. Experimentation found good results with 64 FFTs worth of data, 32 before and 32 after the current point in time. While this idea can be implemented in large arrays in a software algorithm, an FPGA based approach may not have sufficient storage. It generally has to deal with data as it arrives. One solution to this is to delay the grouping algorithm until 32 FFTs have passed. Thus, the cutting algorithm can work with 64 sets of data that have occurred in the past relative to the cutting algorithm, but 32 FFTs worth of them exist "in the future" relative to the delayed data.

Figure 8A:
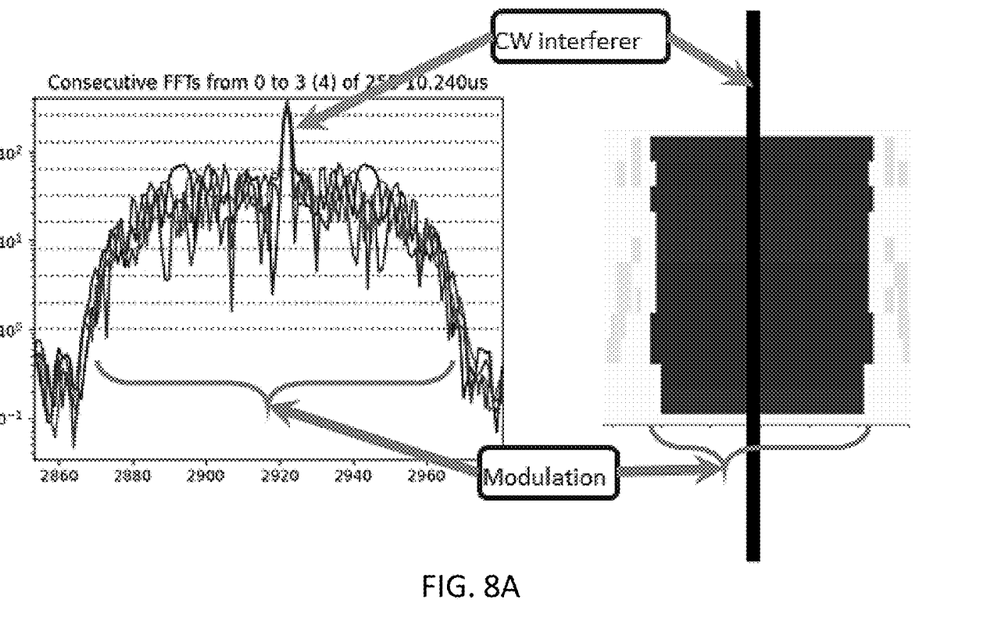
FIGS. 8A-8B illustrate how the system can be configured for CW override.
Figure 8B:
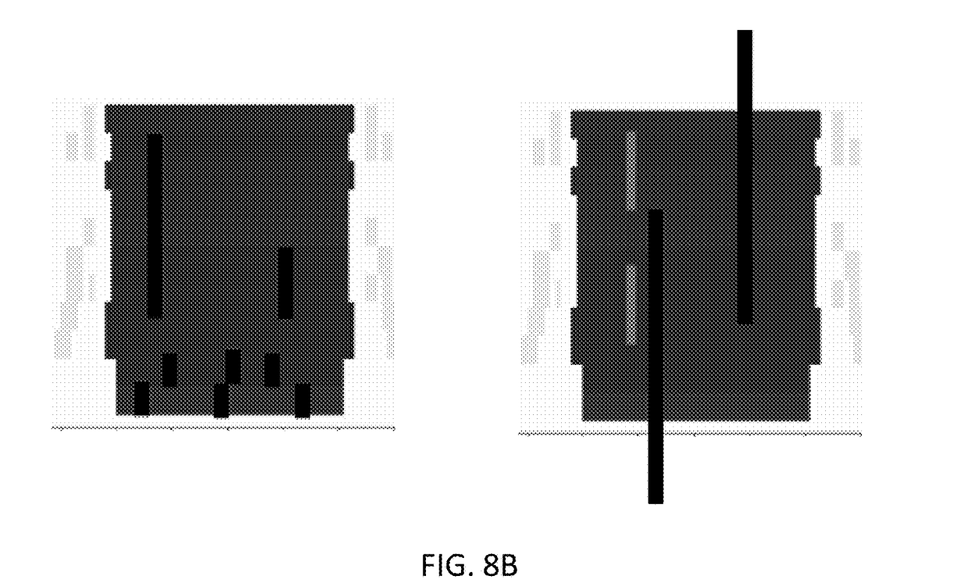

FIGS. 8A-8B illustrate how the system can be configured for CW override. Consider a typical modulated signal that lasts for several FFTs with an overall bandwidth of a few MHz. It might be a frequency hopping modulation. Of the many reasons for hopping, one of them is to avoid other signals. A hopping signal in a busy spectrum may hop into and out of areas where other signals exist.

If a large CW signal exists, and the hopping signal lands on top of it (or if a modulation is perhaps jammed) then there will be a CW and modulation occupying the same frequency space. FIG. 8A illustrates a case of CW interference. Consider the waveform diagram on the left in FIG. 8A, which includes several consecutive FFT amplitude waveforms of a modulated signal. Most of the waveforms exhibit randomness but there is a non-random large pulse in the middle. This is shown diagrammatically on the right of FIG. 8A, where the spectrogram snapshot shows a representation of the amplitudes of the smaller modulated signal and the larger CW signal.

In this particular case, the modulation lasts for 11 FFT times and the CW looks continuous. CWs are processed and detected in a completely different place from the groups. The circuit (and software) can detect both the CW and the group. Therefore, when this interference occurs, both signals are outputted to the test visualization system. The system can adjust the reported amplitude. In this case, the CW is a lot bigger than the surrounding modulation. The actual amplitude of the modulation lies somewhere between 10 and 100 whereas the CW amplitude is way over 1,000.

One amplitude algorithm for modulation amplitude was to choose the largest amplitude inside the group. This can be modified in the presence of CWs so that the amplitude is now calculated as the largest within a group excluding the amplitude of any signal flagged as an overriding CW. The CW amplitude remains as the average amplitude of all its constituent signals.

The illustrated case is a very clear, simple case of CW interference. In the more general case, it gets a bit more complicated. By its very nature, a modulated signal is made up of random peaks and valleys. It is quite possible for these random peaks and valleys to align between two or more consecutive FFTS. The CW detection circuitry/algorithm will detect this repeated peak location, with similar bandwidth, as a CW. Short random occurrences of CW-like signals are not actually interfering CWs. On the other hand, a modulated pulse might last for a very long time and an interfering CW may appear and disappear during the modulation. This is a case that would be of interest to the test engineer.

Consider a more general case of the spectrogram shown in FIG. 8A. FIG. 8B shows two spectrograms. The spectrogram on the left shows where all the CWs are. These are primarily caused by the random peaks matching location in consecutive FFTs. As the number of consecutive FFTs increases, the incidence of random repeated peaks diminishes rapidly. At some point, the length of a set of repeating peaks, with similar bandwidths, becomes more likely to be a CW than a randomly caused "fake" CW. To determine the difference between "real" and "fake" CWs, the system uses a fixed value (of 16 consecutive FFTs, for example) to determine that a CW is a CW when wholly "surrounded" by a modulation.

The spectrogram on the right in FIG. 8B shows the case where a CW starts or ends outside the modulation. Outside the modulation there are no adjacent signals. In this case, it should be more clear that this is a CW. Consequently, the existence of a CW outside the modulation overrides the 16-long requirement. If a CW lasts for N FFTs (e.g., 2 FFTs) outside a modulation then it is flagged as a CW even if it is only N+1 FFTs (e.g., 3 FFTs) long. The system can be configured to handle the case where the CW starts within the modulation and continues after it.

Again, in the FPGA, this is dealt with by delaying the grouping algorithm until after the CWs have been determined to be "isolated" for N (or more) FFTs. This isolation test can be done on the raw signal set before grouping takes place. If a CW is determined to be long enough, or isolated enough, then a bit is set against that bucket and both the CW and modulation are output with their respective corrected amplitudes.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
receiving a time series of radio frequency (RF) spectra of a test RF signal;
identifying a first plurality of detected signals within the time series of RF spectra;
relating the first plurality of detected signals to a second plurality of detected signals within the time series of RF spectra;
characterizing the first plurality of detected signals and the second plurality of detected signals with a set of characteristic parameters; and
outputting a reduced size time series of RF spectra using the set of characteristic parameters;
wherein outputting the reduced size time series of RF spectra comprises outputting the reduced size time series of RF spectra to a test visualization system configured to present, to a test engineer, at least a portion of the reduced size time series of RF spectra to highlight one or more aspects of the first plurality of detected signals and the second plurality of detected signals.

2. The method of claim 1, wherein characterizing the first plurality of detected signals comprises characterizing a first detected signal with a frequency position, bandwidth, amplitude, and start time.

3. The method of claim 2, wherein characterizing the first detected signal comprises discarding one or more variations in bandwidth that are smaller than a threshold variation.

4. The method of claim 1, wherein relating the first plurality of detected signals to the second plurality of detected signals comprises joining the first plurality of detected signals and the second plurality of detected signals into a group of signals.

5. The method of claim 4, wherein characterizing the first plurality of detected signals and the second plurality of detected signals comprises characterizing the entire group of signals with a frequency position, bandwidth, amplitude, and start time.

6. The method of claim 4, wherein joining the first plurality of detected signals and the second plurality of detected signals into a group of signals comprises applying an amplitude threshold and discarding one or more signals having a peak amplitude below the amplitude threshold.

7. The method of claim 4, wherein joining the first plurality of detected signals and the second plurality of detected signals into a group of signals comprises producing a plurality of cutting points, detecting that the group of signals traverses a first cutting point, and breaking the group of signals into two separate groups of signals.

8. The method of claim 1, wherein characterizing the first plurality of detected signals comprises characterizing a first detected signal with a bandwidth by determining a region of the first detected signal that is great than or equal to a threshold percentage of a peak value of the first detected signal.

9. The method of claim 1, wherein outputting the reduced size time series of RF spectra comprises outputting the reduced size time series of RF spectra to a test visualization system configured to present, to a test engineer, at least a portion of the reduced size time series of RF spectra using to highlight one or more aspects of the first plurality of detected signals and the second plurality of detected signals.

10. The method of claim 1, wherein characterizing the first plurality of detected signals and the second plurality of detected signals with a set of characteristic parameters is performed in real-time at 1 Gsample per second or faster.

11. A system comprising:
an input for receiving a time series of radio frequency (RF) spectra of a test RF signal;
a circuit configured for:
identifying a first plurality of detected signals within the time series of RF spectra;
relating the first plurality of detected signals to a second plurality of detected signals within the time series of RF spectra;
characterizing the first plurality of detected signals and the second plurality of detected signals with a set of characteristic parameters; and
outputting a reduced size time series of RF spectra using the set of characteristic parameters;
wherein outputting the reduced size time series of RF spectra comprises outputting the reduced size time series of RF spectra to a test visualization system configured to present, to a test engineer, at least a portion of the reduced size time series of RF spectra to highlight one or more aspects of the first plurality of detected signals and the second plurality of detected signals.

12. The system of claim 11, wherein characterizing the first plurality of detected signals comprises characterizing a first detected signal with a frequency position, bandwidth, amplitude, and start time.

13. The system of claim 12, wherein characterizing the first detected signal comprises discarding one or more variations in bandwidth that are smaller than a threshold variation.

14. The system of claim 11, wherein relating the first plurality of detected signals to the second plurality of detected signals comprises joining the first plurality of detected signals and the second plurality of detected signals into a group of signals.

15. The system of claim 14, wherein characterizing the first plurality of detected signals and the second plurality of detected signals comprises characterizing the entire group of signals with a frequency position, bandwidth, amplitude, and start time.

16. The system of claim 14, wherein joining the first plurality of detected signals and the second plurality of detected signals into a group of signals comprises applying an amplitude threshold and discarding one or more signals having a peak amplitude below the amplitude threshold.

17. The system of claim 14, wherein joining the first plurality of detected signals and the second plurality of detected signals into a group of signals comprises producing a plurality of cutting points, detecting that the group of signals traverses a first cutting point, and breaking the group of signals into two separate groups of signals.

18. The system of claim 11, wherein characterizing the first plurality of detected signals comprises characterizing a first detected signal with a bandwidth by determining a region of the first detected signal that is great than or equal to a threshold percentage of a peak value of the first detected signal.

19. The system of claim 11, wherein outputting the reduced size time series of RF spectra comprises outputting the reduced size time series of RF spectra to a test visualization system configured to present, to a test engineer, at least a portion of the reduced size time series of RF spectra using to highlight one or more aspects of the first plurality of detected signals and the second plurality of detected signals.

20. The system of claim 11, wherein characterizing the first plurality of detected signals and the second plurality of detected signals with a set of characteristic parameters is performed in real-time at 1 Gsample per second or faster.

* * * * *